(12) United States Patent
Wu

(10) Patent No.: US 11,562,614 B2
(45) Date of Patent: Jan. 24, 2023

(54) METHOD, A DEVICE AND A SYSTEM FOR CHECKOUT

(71) Applicant: Yi Tunnel (Beijing) Technology Co., Ltd., Beijing (CN)

(72) Inventor: Yili Wu, Beijing (CN)

(73) Assignee: YI TUNNEL (BEIJING) TECHNOLOGY CO., LTD., Beijing (CN)

( * ) Notice: Subject to any disclaimer, the term of this patent is extended or adjusted under 35 U.S.C. 154(b) by 876 days.

(21) Appl. No.: 16/330,074

(22) PCT Filed: Jan. 2, 2018

(86) PCT No.: PCT/CN2018/070015
§ 371 (c)(1),
(2) Date: Mar. 1, 2019

(87) PCT Pub. No.: WO2019/127618
PCT Pub. Date: Jul. 4, 2019

(65) Prior Publication Data
US 2019/0325689 A1    Oct. 24, 2019

(30) Foreign Application Priority Data

Dec. 25, 2017  (CN) .......................... 201711424661.7
Dec. 25, 2017  (CN) .......................... 201721843306.9

(51) Int. Cl.
*G07F 11/62* (2006.01)
*G06N 3/08* (2006.01)
(Continued)

(52) U.S. Cl.
CPC ............... *G07F 11/62* (2013.01); *G06N 3/08* (2013.01); *G06Q 30/0633* (2013.01);
(Continued)

(58) Field of Classification Search
CPC ............... G07G 1/0036; G07G 1/0063; G07C 9/00574; G06Q 30/0633; G06Q 20/18;
(Continued)

(56) References Cited

U.S. PATENT DOCUMENTS 9,129,250 B1 * 9/2015 Sestini ................. G06Q 10/087
10,083,430 B2 * 9/2018 Hay ....................... G06Q 20/20
(Continued)

FOREIGN PATENT DOCUMENTS

CN      103309438 A      9/2013
CN      105324714 A      2/2016
(Continued)

OTHER PUBLICATIONS

International Search Report issued in International Patent Application No. PCT/CN2018/070015 dated Mar. 15, 2018, 8 pp.
(Continued)

*Primary Examiner* — Daniel I Walsh
(74) *Attorney, Agent, or Firm* — United IP Counselors, LLC

(57) ABSTRACT

The present invention discloses a method, a device and a system for checkout, and belongs to the technical field of computer. The checkout method comprises: verifying whether a received unlocking request is sent by a pre-registered customer, and if so, issuing an unlocking instruction for opening an accommodating case in which a shelf for bearing the item is arranged and associating the customer with a take-up action or a put-back action aiming at an item; generating a shopping list of the customer, after identifying the take-up action or the put-back action and the item at which the take-up action or the put-back action aims; and performing checkout of the shopping list. The present invention further discloses a checkout device which comprises a registration module, a verification association module, a
(Continued)

shopping list generation module and a checkout module. The present invention further discloses a checkout device which comprises a camera, a processor and a memory. The present invention further discloses a checkout system which comprises a client terminal, an accommodating case and a checkout device. According to the present invention, the selling process is friendly, the customer experience is good, a plurality of various items can be purchased in one transaction, and the purchasing procedure is convenient and fast.

7 Claims, 3 Drawing Sheets

(51) Int. Cl.
    *G06V 40/20*     (2022.01)
    *G06Q 30/06*     (2012.01)
    *G07C 9/00*     (2020.01)
    *G07G 1/00*     (2006.01)

(52) U.S. Cl.
    CPC .......... *G06V 40/28* (2022.01); *G07C 9/00571* (2013.01); *G07G 1/0036* (2013.01)

(58) Field of Classification Search
    CPC .... G06Q 10/087; G06N 3/08; G06K 9/00355; G07F 11/62
    See application file for complete search history.

(56) References Cited

U.S. PATENT DOCUMENTS

| | | | |
|---|---|---|---|
| 10,165,194 B1* | 12/2018 | Baldwin | H04N 9/04555 |
| 10,262,293 B1* | 4/2019 | Prater | G06Q 10/087 |
| 10,332,066 B1* | 6/2019 | Palaniappan | G01G 19/42 |
| 10,372,130 B1* | 8/2019 | Kaushansky | B60W 60/001 |
| 10,387,524 B2* | 8/2019 | O'Connell, Jr. | G06F 16/958 |
| 10,520,352 B1* | 12/2019 | Shi | A47F 3/0426 |
| 10,809,122 B1* | 10/2020 | Danenberg | G01G 21/08 |
| 10,853,702 B2* | 12/2020 | Wu | G06N 20/10 |
| 10,885,336 B1* | 1/2021 | Davis | H04W 4/029 |
| 11,042,836 B1* | 6/2021 | Goldstein | G06Q 10/087 |
| 11,068,949 B2* | 7/2021 | McDonald | G06T 7/74 |
| 11,117,744 B1* | 9/2021 | Medioni | G06Q 10/087 |
| 11,132,637 B1* | 9/2021 | Hahn | H04W 4/35 |
| 11,195,140 B1* | 12/2021 | Munger | G07G 1/0072 |
| 11,416,718 B2* | 8/2022 | Wu | G06Q 10/087 |
| 2014/0316916 A1* | 10/2014 | Hay | G06Q 20/20 705/17 |
| 2015/0019391 A1* | 1/2015 | Kumar | G06Q 10/087 705/28 |
| 2016/0203499 A1* | 7/2016 | Yamashita | G06V 20/52 705/7.29 |
| 2017/0301173 A1* | 10/2017 | Hindsgaul | G07F 17/0014 |
| 2018/0165728 A1* | 6/2018 | McDonald | G06Q 20/208 |
| 2018/0211128 A1* | 7/2018 | Hotson | G01S 17/89 |
| 2018/0253708 A1* | 9/2018 | Mohanakrishnan | G06Q 30/06 |
| 2019/0130250 A1* | 5/2019 | Park | G06N 5/046 |
| 2019/0149725 A1* | 5/2019 | Adato | H04N 1/32144 348/158 |
| 2019/0172039 A1* | 6/2019 | Kambara | G06Q 20/208 |
| 2019/0197356 A1* | 6/2019 | Kurita | G06K 9/6254 |
| 2019/0220748 A1* | 7/2019 | Denil | G06N 3/084 |
| 2019/0228457 A1* | 7/2019 | Wu | G06K 9/6217 |
| 2019/0236531 A1* | 8/2019 | Adato | G06F 16/288 |
| 2019/0325689 A1* | 10/2019 | Wu | G06Q 30/0633 |
| 2019/0370902 A1* | 12/2019 | Yiin | G06N 3/08 |
| 2020/0092454 A1* | 3/2020 | Itoh | H04N 5/23218 |
| 2020/0293813 A1* | 9/2020 | Shibata | G06K 9/6256 |
| 2020/0410572 A1* | 12/2020 | Higa | G06V 20/52 |
| 2021/0004568 A1* | 1/2021 | Uno | G06K 9/00288 |
| 2021/0019547 A1* | 1/2021 | Vishal | G06F 16/583 |
| 2021/0027360 A1* | 1/2021 | Shmueli | G06Q 30/0635 |
| 2021/0065281 A1* | 3/2021 | Haulk | G06V 40/107 |
| 2021/0081749 A1* | 3/2021 | Claire | G10L 15/1815 |
| 2021/0177163 A1* | 6/2021 | Cohn | B62B 3/1428 |
| 2021/0224592 A1* | 7/2021 | Wu | G06K 9/6259 |
| 2021/0232897 A1* | 7/2021 | Bichler | G06N 3/0454 |
| 2021/0241071 A1* | 8/2021 | Lorrain | G06F 5/01 |
| 2021/0279784 A1* | 9/2021 | Wu | G06Q 30/0283 |
| 2021/0304122 A1* | 9/2021 | Dattamajumdar | G06T 7/74 |
| 2021/0342807 A1* | 11/2021 | Meidar | G06Q 20/208 |
| 2021/0357705 A1* | 11/2021 | Sung | G06N 3/0454 |
| 2021/0383096 A1* | 12/2021 | White | G06K 9/6253 |
| 2021/0383673 A1* | 12/2021 | Croxford | G06T 19/006 |
| 2021/0398097 A1* | 12/2021 | Wu | G06V 40/28 |
| 2022/0051179 A1* | 2/2022 | Savvides | G06F 16/583 |
| 2022/0114352 A1* | 4/2022 | Chang | G06V 20/20 |
| 2022/0114868 A1* | 4/2022 | Bronicki | G06V 20/52 |
| 2022/0171972 A1* | 6/2022 | Stankovic | G06V 10/25 |
| 2022/0198550 A1* | 6/2022 | Meidar | G06Q 20/20 |

FOREIGN PATENT DOCUMENTS

| | | |
|---|---|---|
| CN | 106781014 A | 5/2017 |
| CN | 107301749 A | 10/2017 |
| CN | 206757798 U | 12/2017 |

OTHER PUBLICATIONS

International Search Report issued in International Patent Application No. PCT/CN2018/070015, dated Aug. 22, 2018 with English Translation.

Written Opinion issued in International Patent Application No. PCT/CN2018/070015, dated Aug. 22, 2018 with English Translation.

\* cited by examiner

```
┌─────────────────────────────────────────────────────────────────┐
│ performing target detection on the plurality of acquired frames │── S21
│ of hand images containing the item to obtain a plurality of     │
│ rectangular area images correspondingly, wherein the            │
│ rectangular area images are images corresponding to             │
│ rectangular areas containing the item, and the plurality of     │
│ frames of hand images correspond to a plurality of cameras in a │
│ one-to-one manner                                               │
└─────────────────────────────────────────────────────────────────┘
                                 │
┌─────────────────────────────────────────────────────────────────┐
│ acquiring a plurality of primary classification results         │── S22
│ correspondingly, according to the plurality of rectangular area │
│ images and a pre-trained first-level classification model, and  │
│ acquiring a first-level classification result of the plurality  │
│ of frames of hand images according to the plurality of primary  │
│ classification results and a pre-trained first-level linear     │
│ regression model, wherein the pre-trained first-level           │
│ classification model is a model that is constructed by an image │
│ identification technique of a convolutional neural network and  │
│ trained by all the items in the accommodating case              │
└─────────────────────────────────────────────────────────────────┘

┌─────────────────────────────────────────────────────────────────┐
│ obtaining a plurality of secondary classification results       │
│ correspondingly, according to the plurality of rectangular area │
│ images and a pre-trained second-level classification model,     │
│ acquiring a second-level classification result of the plurality │
│ of frames of hand images according to the plurality of          │
│ secondary classification results and a pre-trained second-      │── S25
│ level linear regression model, and using the second-level       │
│ classification result as a first classification result, in case │
│ that the first-level classification result is a similar item,   │
│ wherein the second-level classification model is a model that   │
│ is constructed by the image identification technique of the     │
│ convolutional neural network and trained by the items in a      │
│ similar item group in the accommodating case in advance         │
└─────────────────────────────────────────────────────────────────┘
                                 │
         ┌────────────────────────────────────────────┐
         │ using the first-level classification result │── S23
         │ as a first classification result            │
         └────────────────────────────────────────────┘
                                 │
         ┌────────────────────────────────────────────┐
         │ using the first classification result as a  │── S24
         │ to-be- identified item                      │
         └────────────────────────────────────────────┘
```

Fig.3

METHOD, A DEVICE AND A SYSTEM FOR CHECKOUT

BACKGROUND

Field of Invention

The present invention belongs to the technical field of computer, and specifically relates to a method, a device and a system for checkout.

Background of the Invention

A selling machine (or called as a vending machine) do not need to be watched by a cashier and are convenient to sell an item, and thus are very popular in relatively crowded areas, such as stations, shopping malls, hospitals and schools. The selling machine has the following selling procedure in which a customer selects an item of interest, touches a key corresponding to the item, and then completes the paying procedure by inputting a coin or paper money or using mobile payments, such as Alipay, WeChat and the like so as to get the item.

With the development of the information technology, an increasing number of customers feel that the selling procedure of the selling machine is unfriendly for failing to implement the checkout mode of "Just Walk Out" in which the customers can leave immediately after selecting an item. Moreover, the selling machine can only complete a transaction of one item each time. When the customers need to purchase a plurality of items, the transaction needs to be repeatedly carried out. Therefore, the purchasing procedure is inconvenient. Moreover, samples, instead of actual salable items, are placed on a shelf of the selling machine, and only one row of samples can be placed on the shelf. Hence, there are very few categories of items, and the demands of the customers for item diversification cannot be met.

SUMMARY

In order to solve the problem that the selling machine cannot implement the checkout mode of "Just Walk Out" in the prior art. In one aspect, the present invention provides a checkout method, comprising the steps of: (S1) verifying whether a received unlocking request is sent by a pre-registered customer, and if so, issuing an unlocking instruction for opening an accommodating case in which a shelf for bearing the item is arranged, and associating the customer with a take-up action or a put-back action aiming at an item; (S2) generating a shopping list of the customer, after identifying the take-up action or the put-back action, and the item at which the take-up action or the put-back action aims; and (S3) performing checkout of the shopping list.

In the above-mentioned checkout method, preferably, in the step (S2), identifying the take-up action or the put-back action specifically comprises: acquiring a plurality of frames of consecutive hand images of the customer in front of the shelf, and establishing a motion track of a hand for the plurality of frames of consecutive hand images on a timeline, in case that it is detected that the motion track of the hand is an inward movement from the outside of a predetermined virtual action boundary and the item is taken in the hand, identifying the action as the put-back action; in case that it is detected that the motion track of the hand is an outward movement from the inside of the virtual action boundary and the item is taken in the hand, identifying the action as the take-up action, in which the outside of the virtual action boundary is in a direction away from the shelf, and the inside of the virtual action boundary is in a direction close to the shelf.

In the above-mentioned checkout method, preferably, in the step (S2), identifying the item at which the take-up action or the put-back action aims specifically comprises the steps of: (S21) performing target detection on the plurality of acquired frames of hand images containing the item to obtain a plurality of rectangular area images correspondingly, in which the rectangular area images are images corresponding to rectangular areas containing the item, and the plurality of frames of hand images correspond to a plurality of cameras in a one-to-one manner; (S22) acquiring a plurality of primary classification results correspondingly, according to the plurality of rectangular area images and a pre-trained first-level classification model, and acquiring a first-level classification result of the plurality of frames of hand images according to the plurality of primary classification results and a pre-trained first-level linear regression model, in which the pre-trained first-level classification model is a model that is constructed by an image identification technique of a convolutional neural network and trained by all the items in the accommodating case; (S23) using the first-level classification result as a first classification result; and (S24) using the first classification result as a to-be-identified item.

In the above-mentioned checkout method, preferably, after the step (S22) and before the step (S24), the method further comprises the step of: (S25) obtaining a plurality of secondary classification results correspondingly, according to the plurality of rectangular area images and a pre-trained second-level classification model, acquiring a second-level classification result of the plurality of frames of hand images according to the plurality of secondary classification results and a pre-trained second-level linear regression model, and using the second-level classification result as a first classification result, in case that the first-level classification result is a similar item, in which the second-level classification model is a model that is constructed by the image identification technique of the convolutional neural network and pre-trained by the items in a similar item group in the accommodating case in advance; otherwise, executing the step (S23).

In another aspect, the present invention provides a checkout device, comprising: a registration module configured to receive identity information and account information which are inputted by a customer upon registration; a verification association module configured to be connected with the registration module and configured to verify whether a received unlocking request is sent by a pre-registered customer, and if so, the verification association module issues an unlocking instruction for opening an accommodating case in which a shelf for bearing the item is arranged, and associates the customer with a take-up action or a put-back action aiming at an item; a shopping list generation module configured to be connected with the verification association module and configured to generate a shopping list of the customer after identifying the take-up action or the put-back action and the item at which the take-up action or the put-back action aims; and a checkout module configured to be connected with the shopping list generation module and configured to perform checkout of the shopping list generated by the shopping list generation module.

In the above-mentioned checkout device, preferably, the shopping list generation module comprises: an action identification unit configured to acquire a plurality of frames of consecutive hand images of the customer in front of the shelf, and establish a motion track of a hand for the plurality of frames of consecutive hand images on a timeline, in case that it is detected that the motion track of the hand is an inward movement from the outside of a predetermined virtual action boundary and the item is taken in the hand, identify the action as the put-back action; in case that it is detected that the motion track of the hand is an outward movement from the inside of the virtual action boundary and the item is taken in the hand, identify the action as the take-up action, in which the outside of the virtual action boundary is in a direction away from the shelf, and the inside of the virtual action boundary is in a direction close to the shelf; an item identification unit configured to identify the item at which the take-up action or the put-back action aims; and a shopping list generation unit configured to be connected with the verification association module, the action identification unit and the item identification unit, and configured to generate the shopping list of the customer according to the identity information of the customer associated by the verification association module, the take-up action or the put-back action identified by the action identification unit and the item at which the take-up action or the put-back action aims identified by the item identification unit.

In the above-mentioned checkout device, preferably, the item identification unit comprises: a target detection subunit configured to perform target detection on the plurality of frames of hand images containing the item that are acquired by the action identification unit, in order to obtain a plurality of rectangular area images correspondingly, in which the rectangular area images are images corresponding to rectangular areas containing the item, and the plurality of frames of hand images correspond to a plurality of cameras in a one-to-one manner; a first classification subunit configured to acquire a plurality of primary classification results correspondingly, according to the plurality of rectangular area images and a pre-trained first-level classification model, and acquire a first-level classification result of the plurality of frames of hand images according to the plurality of primary classification results and a pre-trained first-level linear regression model, in which the pre-trained first-level classification model is a model that is constructed by an image identification technique of a convolutional neural network and trained by all items in the accommodating case; a confirmation subunit configured to use the first-level classification result as a first classification result; and a result determination subunit configured to use the first classification result as a to-be-identified item.

In the above-mentioned checkout device, preferably, the item identification unit further comprises: a judgment subunit configured to be connected with the first classification subunit and a second classification subunit, and configured to judge whether the first-level classification result is a similar item, and if so, the second classification subunit is executed; otherwise, the first classification subunit is executed; and the second classification subunit configured to obtain a plurality of secondary classification results correspondingly, according to the plurality of rectangular area images and a pre-trained second-level classification model, acquire a second-level classification result of the plurality of frames of hand images according to the plurality of secondary classification results and a pre-trained second-level linear regression model, and using the second-level classification result as a first classification result, in which the second-level classification model is a model that is constructed by an image identification technique of a convolutional neural network and trained by all the items in the accommodating case in advance.

In still a further aspect, the present invention provides a checkout device, comprising: a camera configured to be arranged on an accommodating case in which a shelf for bearing an item is arranged and configured to acquire a hand image of a customer; a processor; and a memory that records processor-executable instructions, in which the processor is configured to verify whether a received unlocking request is sent by the pre-registered customer, if so, issue an unlocking instruction for opening the accommodating case, associate the customer with a take-up action or a put-back action aiming at the item, generating a shopping list of the customer after identifying the take-up action or the put-back action and the item at which the take-up action or the put-back action aims, and perform checkout of the shopping list.

In still a further aspect, the present invention provides a checkout system, comprising: the client terminal for receiving identity information inputted by a customer upon registration and sending the identity information to a checkout device, and receiving a shopping list issued by the checkout device; an accommodating case in which a shelf for bearing an item is arranged, and a door of the accommodating case is provided with a door lock; and a checkout device that is the above-mentioned checkout device.

Embodiments of the present invention bring the following beneficial effects by the above-mentioned technical solutions.

The selling procedure is friendly, and the customer experience is good. A plurality of various items can be purchased in one transaction, and the purchasing procedure is convenient and fast.

BRIEF DESCRIPTION OF THE DRAWINGS

FIG. 3 is a schematic flowchart of another image identification method based on the convolutional neural network provided in an embodiment of the present invention.

DETAILED DESCRIPTION OF THE EMBODIMENTS

In order to make objects, technical solutions and advantages of the present invention more apparent, the embodiments of the present invention will be further described in detail below in connection with the drawings.

an item involved in the checkout method provided in the embodiment of the present invention is placed in the accommodating case by using the shelf. The accommodating case can have a single-layer shelf on which a single item, or multiple rows and multiple columns of items are placed. The accommodating case can also have a multi-layer shelf, and multiple rows and multiple columns of items are placed on each layer of the shelf, so as to facilitate a customer to purchase a plurality of various items by one time, which is not limited in the embodiment. The accommodating case is an independent case body and can be placed in a crowded area such as shopping malls, stations, hospitals, schools and the like. According to a people flow condition, the accommodating case can be located in the crowded area at any moment by transferring it, so that the cost is relatively low.

Moreover, a fixed space can also be formed in a building for using as an accommodating case. In order to facilitate the customer to know which items are placed in the accommodating case before opening the accommodating case, so as to confirm whether there are items to be purchased by the customer, a material of a door of the accommodating case is a transparent material. Because each item has different storage condition, the accommodating case can be an accommodating case with a refrigeration function, so as to avoid deterioration of items which need to be stored at a low temperature. For example, a refrigeration chamber is provided at the lower portion of the accommodating case.

Figure 1:
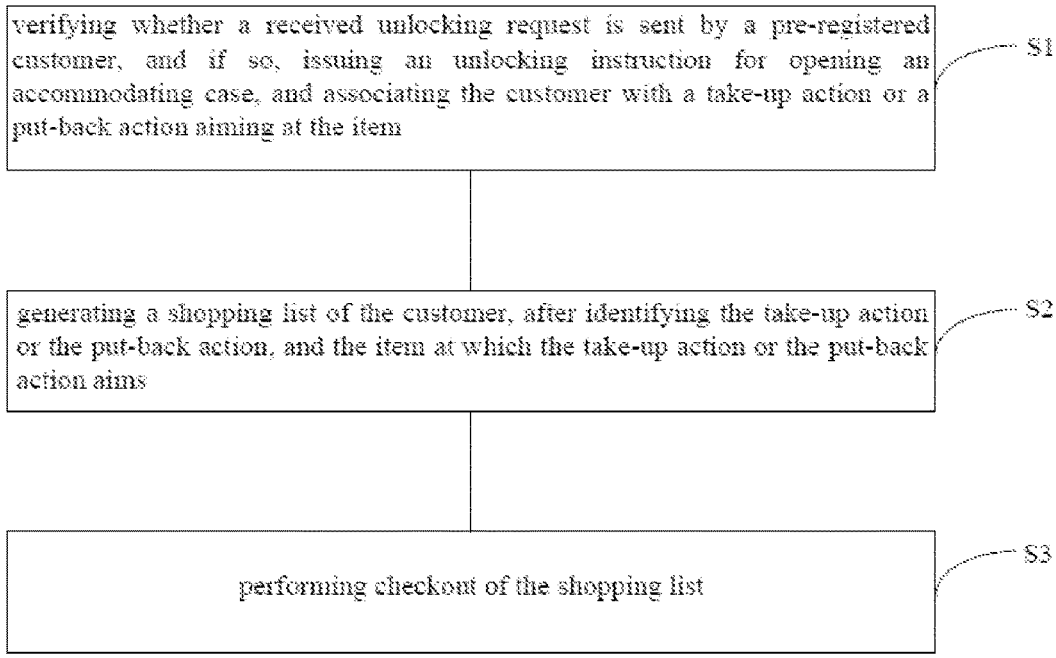
FIG. 1 is a schematic flowchart of the checkout method provided in an embodiment of the present invention.

An embodiment of the present invention provides the checkout method. With reference to FIG. 1, the method comprises the following steps of S1 to S3.

In the step S1, it is verified whether a received unlocking request is sent by a pre-registered customer. If so, an unlocking instruction is issued, and the customer is associated with a take-up action or a put-back action aiming at an item. The unlocking instruction is used for opening the accommodating case.

Specifically, when the customer comes to the accommodating case and finds an item to be purchased, he can complete registration according to a registration procedure sticked on the accommodating case or red through logging in a website link reserved on the accommodating case. Upon registration, an Application (App) corresponding to the checkout method needs to be installed, and identity (ID) information of the customer also needs to be acquired. The identity information includes but is not limited to a mobile phone number or an ID number, and a payment account of the customer, in which the payment account can be a bank account and can also be a third-party payment account, such as Alipay, WeChat Pay, QQ Wallet, JD Wallet and the like. The identity information can also include the name, gender and profession of the customer. The registration of the customer can also be completed by an applet (or called as WeChat applet) corresponding to the checkout method in WeChat. The registration of the customer can also be completed by subscribing a WeChat official account corresponding to the checkout method. Then, the customer scans a two-dimensional code or a bar code representative of identity information of the accommodating case at the accommodating case by using the App or the applet or the official account, so as to issue an unlocking request to a checkout device. The checkout device confirms, through verification, that the customer is a registered customer and then can issue an unlocking instruction to the accommodating case. The unlocking instruction is directly used for opening a door lock of the accommodating case without manually inputting an unlocking password by the customer. The unlocking instruction can also be sent to a client terminal. The unlocking instruction displays a password for opening the door lock of the accommodating case. The customer can unlock the door lock only by manually inputting the unlocking password. Furthermore, the customer is associated with a take-up action or a put-back action aiming at the item in the accommodating case, i.e., this shopping behavior is confirmed as a shopping behavior belonging to the customer. In other words, if a person triggers the checkout device to issue an unlocking instruction, the shopping behavior is confirmed as belonging to the person. After the door lock is unlocked, the door is opened automatically or by the customer through pulling it outwards or pushing it horizontally, and then the customer can select items in front of the accommodating case. If the customer has not completed registration, it can be verified that the customer is a non-registered user, then the door lock of the accommodating case keeps locked and the customer cannot do shopping. At this time, the customer can be prompted that shopping can be done only with completion of registration. In other embodiments, a biometric identifier, such as a fingerprint identifier and a face identifier, can be arranged on the accommodating case to identify the ID of the customer by means of biometric identification technology. When the customer registers on the App, biological data of the customer, such as fingerprint data, can be acquired. The unlocking request is sent to the checkout device, after the biometric identifier received the information of the customer, so that the customer can still purchase the item in the accommodating case, although the registered customer forgot to bring his mobile equipment.

In the step S2, a shopping list of the customer is generated, after identifying the take-up action or the put-back action and the item at which the take-up action or the put-back action aims.

Specifically, it is known which customer carries out the take-up action or the put-back action on the item, after the customer is associated with the take-up action or the put-back action aiming at the item. After the take-up action or the put-back action and the item at which the take-up action or the put-back action aims are identified, the shopping list corresponding to the customer can be generated. When the customer applies a take-up action on the item, the item can be correspondingly added on the shopping list of the customer; and when the customer applies a put-back action on the item, the item can be corresponding deleted from the shopping list, i.e., the shopping list can be updated in real time according to the take-up action or the put-back action of the customer.

A method to judge whether the action on the item is the take-up action or the put-back action can adopt the following steps.

A motion track of a hand is established on a timeline according to a plurality of collected frames of consecutive hand images of the customer in front of a shelf, and whether the customer applies the take-up action or the put-back action to the item is judged according to the hand motion track. For example, a camera is deployed at the upper portion of a door frame of the accommodating case and a shooting angle of the camera is downward, so that a shooting range of the camera covers the front area of the shelf, which is beneficial for shooting the hand images of the customer. The camera can shoot a plurality of frames of images per second, e.g., 30 frames. The hand images of the customer captured by the camera are detected frame by frame. The position of the hand in each frame of hand image is marked and saved. The above-mentioned operations are repeated for every frame. In this way, one motion track of the hand can be obtained on the timeline. Not only the position of the hand in each frame of image can be obtained, but also whether the item is taken in the hand can be judged and a category of the item can be confirmed according to a certain frame of hand image. In order to ensure that the hand image is shot and ensure an accuracy of identifying the item, a camera is arranged at the lower portion of the door frame, and its shooting angle is upward. Preferably, a plurality of cameras are provided for each kind of camera.

Specifically, a virtual action boundary is marked in the hand image, and the action boundary is spaced a certain distance, such as 10 cm or 20 cm from the shelf. in case that it is detected that the motion track of the hand is a movement from a position away from the shelf through the action boundary to a position close to the shelf, briefly, a movement from the outside of the action boundary to the inside of the action boundary, and the item is taken in the hand, then it is considered that the hand action is a put-back action on the item; and in case that it is detected that the motion track of the hand is a movement from a position close to the shelf through the action boundary to a position away from the shelf, briefly, a movement from the inside of the action boundary to the outside of the action boundary, and the item is taken in the hand, then it is considered that the hand action is a take-up action on the item.

The camera continuously captures video data, shoots a plurality of (such as dozens of) frames of hand images per second. One frame of hand image at an interval of one second can be obtained, so as to cut out a hand position, and classify (or called as identify) the item in the hand. This can be implemented by a pre-trained classification model described below.

Figure 2:
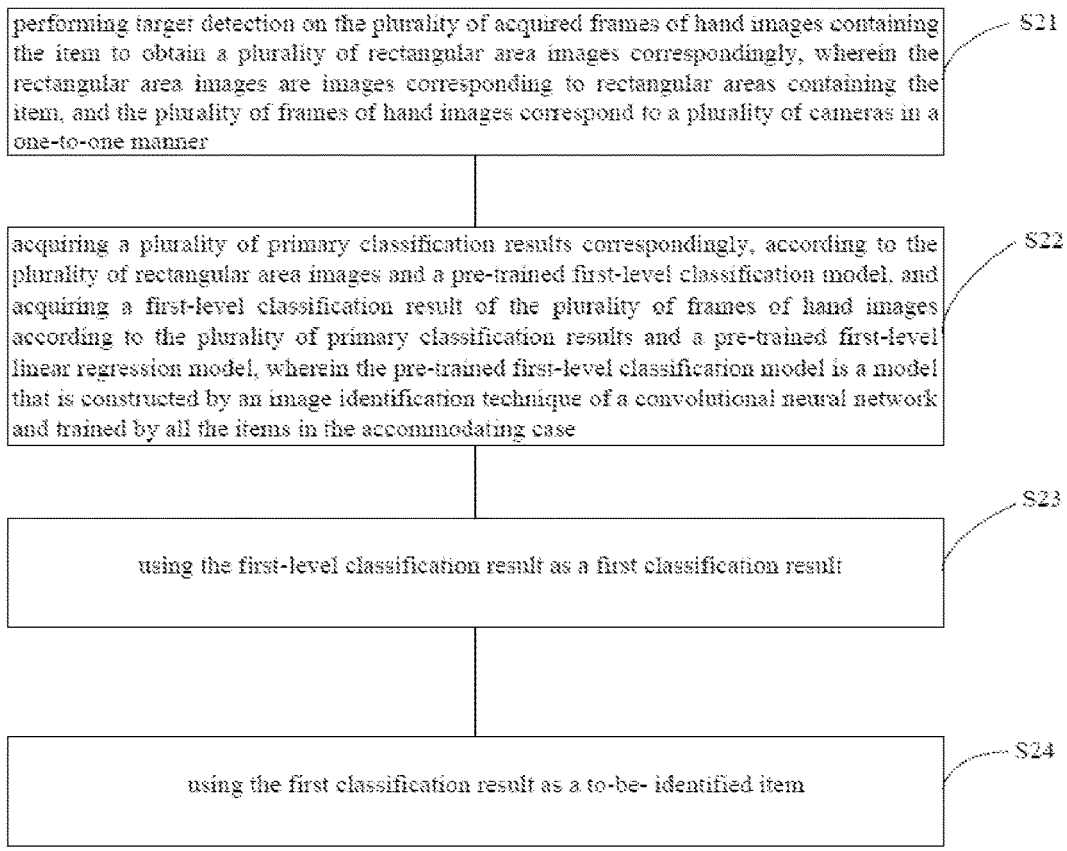
FIG. 2 is a schematic flowchart of an image identification method based on the convolutional neural network provided in an embodiment of the present invention.

With reference to FIG. 2, a method for performing identification on the item at which the take-up action or the put-back action aims can adopt the following steps of S21 to S25.

In the step S21, target detection on the plurality of frames of hand images containing the item is performed so as to obtain a plurality of rectangular area images correspondingly, in which the rectangular area images are images corresponding to rectangular areas containing the item, and the plurality of frames of hand images correspond to a plurality of cameras in a one-to-one manner.

Specifically, when target detection is carried out on the hand image, a rectangular case (or called as the rectangular area) containing the item can be marked out on the hand image. An image corresponding to the rectangular case is an image for performing classification on the item. In order to acquire multiple frames of hand images, a camera needs to be arranged. The camera can be arranged at the upper portion of the door frame of the accommodating case, and in this case, the camera shoots downwards from right above. The camera can also be arranged at the lower portion of the door frame of the accommodating case, and in this case, the camera shoots upwards from right below. Moreover, a part of the cameras can be arranged at the upper portion of the door frame, and the other part thereof can be arranged at the lower portion of the door frame, which is not limited in the embodiment.

In the step S22, a plurality of primary classification results is acquired correspondingly, according to the plurality of rectangular area images and a pre-trained first-level classification model, and a first-level classification result of the plurality of frames of hand images is acquired according to the plurality of primary classification results and a pre-trained first-level linear regression model, in which the pre-trained first-level classification model is a model that is constructed by an image identification technique of a convolutional neural network and trained by all items in the accommodating case.

Specifically, data are collected in advance to establish a data set, and the collecting of the data comprises: 1) shooting all items in the accommodating case from each angle and in each attitude to acquire a great amount of photos; and 2) labeling those photos, i.e., labeling positions, sizes and categories of the items in the photos. The data included in the data set means the above-mentioned photos and labels on those photos. The first-level classification model is a model constructed by an image identification technique of a convolutional neural network, and is trained by using the data of all items in the accommodating case. The training can be carried out in a gradient descent mode.

The trained first-level classification model classifies the item in each rectangular area image to obtain the primary classification result. The primary classification result is an n-dimensional vector, where n represents the total number of items in a shopping place. Each element in the vector represents a probability that the to-be-classified item belongs to each of the n items according to the first-level classification model. When the element has a maximum value in the vector, it means that the to-be-classified item is an item corresponding to the element according to the model. When there are five rectangular area images, the number of the primary classification results is 5 n-dimensional vectors.

When the first-level classification model is trained, the primary classification results outputted by the first-level classification model are used as inputs of the first-level linear regression model, and correct classifications of the items included in the hand images corresponding to the primary classification results are used as outputs of the first-level linear regression model, so as to train the first-level linear regression model. The trained first-level linear regression model carries out data fusion on the plurality of primary classification results to obtain one first-level classification result. The first-level classification result represents that the first-level linear regression model predicts to which category of item in the accommodating case the item in the image belongs.

In the step S23, the first-level classification result is used as the first classification result.

There are various items in the accommodating case. Among the various items, there may be some items which are similar in appearance and may easily be visually confused. Such items are called as similar items, e.g., Golden Delicious apples and yellow snowflake pears. If single to-be-classified item is similar items, the first-level classification model is difficult to accurately classify the items. For example, Golden Delicious apples are confused with yellow snowflake pears and Golden Delicious apples are classified as yellow snowflake pears. Thus, with reference to FIG. 3, after the step S22, the undermentioned step S25 needs to be executed; otherwise, the step S23 is executed, i.e., the first-level classification result is directly used as the first classification result for checkout.

Specifically, in the step S25, if the first-level classification result is similar items, then a plurality of secondary classification results are correspondingly acquired according to the plurality of rectangular area images and a pre-trained second-level classification model, a second-level classification result of the plurality of frames of hand images is acquired according to the plurality of secondary classification results and a pre-trained second-level linear regression model, and the second-level classification result is used as a first classification result. The second-level classification model is a model that is constructed by the image identification technique of the convolutional neural network and trained by items in a similar item group in the accommodating case in advance.

Specifically, the second-level classification model is trained by utilizing data of the similar items in the data set established in the step S22, and the training can be carried out in a gradient descent mode. The second-level classification model differs from the first-level classification model in that different data are used in the training process, in which the data used by the first-level classification model are data of all the items in the shopping place, and the data used by the second-level classification model are the data of the similar items in the accommodating case.

The trained second-level classification model classifies the item in each rectangular area image to obtain the secondary classification result. The secondary classification result is also a m-dimensional vector, and each element in the vector represents a probability that the single to-be-classified item belongs to each of m similar items according to the second-level classification model. When there are five rectangular area images, the number of the secondary classification results is 5 m-dimensional vectors, where m is smaller than or equal to n and represents the total number of the similar items in the accommodating case.

In practice, there are multiple groups of similar items in the accommodating case. For example, one group of similar items comprise Golden Delicious apples and yellow snowflake pears, another group of similar items comprise loose-packed salt and loose-packed white sugar, and yet another group of similar items comprise dietary alkali and flour. One second-level classification model can be trained for all the groups of similar items. In order to further improve accuracy of item classification, one second-level classification model is trained for each group of similar items. At this point, if the first-level classification result is similar items, the second-level classification model corresponding to the first-level classification result is used.

When the second-level classification model is trained, the secondary classification results outputted by the second-level classification model are used as inputs of the second-level linear regression model, and correct classifications of the items included in the images corresponding to the secondary classification results are used as outputs of the second-level linear regression model, so as to train the second-level linear regression model. The trained second-level linear regression model carries out data fusion on the plurality of secondary classification results to obtain one second-level classification result, and the second-level classification result is used as a first classification result. The second-level classification result represents that the second-level linear regression model predicts to which category of item in the accommodating case the item in the image belongs.

In the step S24, the first classification result is used as the to-be-identified item.

After the first classification result is acquired, an item price corresponding to the first classification result is acquired, and thus the cost that the customer needs to pay for the selected item is determined.

In the step S3, after the customer left the accommodating case, the checkout of the shopping list of the customer is performed.

The customer closes the door of the accommodating case after selecting the item. When it is confirmed that the door of the accommodating case is closed, the customer is determined to complete his shopping. Checkout is performed according to the shopping list of the customer, for example, the cost corresponding to the shopping list is deducted from the payment account inputted upon registration of the customer.

In order to facilitate verification of the customer on the purchased items, a identification result can also be sent to the customer in real time. For example, the identification result of each item can be uploaded to a cloud server. Then the cloud server issues the identification result to an App installed in a mobile phone of the customer. The App adds the identification result into a virtual shopping cart and generates the shopping list so as to notify the customer of the shopping list immediately after the item is taken up or put back. It should be noted that the module for executing the step S1 can be arranged on the server side, i.e., this step is executed by a corresponding module in the cloud server. The module for executing the step S2 of identifying the take-up action or the put-back action and the item at which the take-up action or the put-back action aims can be arranged on the accommodating case side, i.e., this step is executed by a corresponding module arranged in the accommodating case, or the module for executing the step S2 can also be arranged on the server side, i.e., this step is executed by a corresponding module in the cloud server, which is not limited in the embodiment. The module for executing the step S2 of generating the shopping list of the customer and the step S3 can be arranged on the accommodating case side, i.e., the steps are executed by a corresponding module arranged in the accommodating case, or the module for executing the step S2 and the step S3 can also be arranged on the server side, i.e., the steps are executed by the cloud server, which is not limited in the embodiment.

Figure 4:
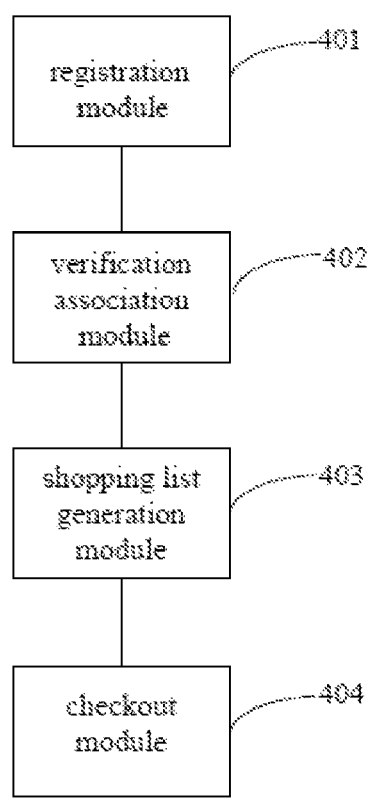
FIG. 4 is a structural schematic diagram of the checkout device provided in an embodiment of the present invention.

With reference to FIG. 4, another embodiment of the present invention provides a checkout device, comprising: a registration module 401, a verification association module 402, a shopping list generation module 403 and a checkout module 404.

The registration module 401 is configured to receive identity information and account information which are inputted by a customer upon registration.

The verification association module 402 is configured to be connected with the registration module 401 and configured to verify whether a received unlocking request is sent by the pre-registered customer, and if so, the verification association module issues an unlocking instruction and associates the customer with a take-up action or a put-back action aiming at an item. The unlocking instruction is configured to open an accommodating case in which a shelf for bearing the item is arranged.

The shopping list generation module 403 is configured to be connected with the verification association module 402 and configured to generate a shopping list of the customer after identifying the take-up action or the put-back action, and the item at which the take-up action or the put-back action aims.

The checkout module 404 is configured to be connected with the shopping list generation module 403 and configured to perform checkout of the shopping list generated by the shopping list generation module 403.

Specifically, the shopping list generation module 403 comprises: an action identification unit, an item identification unit and a shopping list generation unit. The action identification unit is configured to acquire a plurality of frames of consecutive hand images of the customer in front of the shelf and establishing a motion track of a hand for the plurality of frames of consecutive hand images on a timeline, in case that it is detected that the motion track of the hand is an inward movement from the outside of a predetermined virtual action boundary and the item is taken in the hand, the action identification unit identifies the action as the put-back action; in case that it is detected that the motion track of the hand is an outward movement from the inside of the virtual action boundary and the item is taken in the hand, the action identification unit identifies the action as the take-up action, in which the outside of the virtual action boundary is in a direction away from the shelf, and the inside of the virtual action boundary is in a direction close to the shelf. The item identification unit is configured to identify the item at which the take-up action or the put-back action aims. The shopping list generation unit is configured to be connected with the verification association module, the action identification unit and the item identification unit and configured to generate the shopping list of the customer according to the identity information of the customer associated by the verification association module, the take-up action or the put-back action identified by the action identification unit and the item at which the take-up action or the put-back action aims identified by the item identification unit.

Specifically, the item identification unit comprises: a target detection subunit, a first classification subunit, a confirmation subunit and a result determination subunit. The target detection subunit is configured to perform target detection on the plurality of frames of hand images containing the item, which are acquired by the action identification unit, to obtain a plurality of rectangular area images correspondingly, in which the rectangular area images are images corresponding to rectangular areas containing the item, and the plurality of frames of hand images correspond to a plurality of cameras in a one-to-one manner. The first classification subunit is configured to acquire a plurality of primary classification results correspondingly according to the plurality of rectangular area images and a pre-trained first-level classification model, and acquire a first-level classification result of the plurality of frames of hand images according to the plurality of primary classification results and a pre-trained first-level linear regression model, in which the pre-trained first-level classification model is a model that is constructed by the image identification technique of the convolutional neural network and trained by all items in the accommodating case. The confirmation subunit is configured to use the first-level classification result as a first classification result. The result determination subunit is configured to use the first classification result as the to-be-identified item.

The item identification unit further comprises: a judgment subunit and a second classification subunit. The judgment subunit is configured to be connected with the first classification subunit and the second classification subunit, and configured to judge whether the first-level classification result is similar items, and if so, the second classification subunit is executed; otherwise, the first classification subunit is executed. The second classification subunit is configured to obtain a plurality of secondary classification results correspondingly according to the plurality of rectangular area images and a pre-trained second-level classification model, acquire a second-level classification result of the plurality of frames of hand images according to the plurality of secondary classification results and a pre-trained second-level linear regression model, and use the second-level classification result as a first classification result, in which the second-level classification model is a model that is constructed by an image identification technique of a convolutional neural network and trained by all items in the accommodating case in advance.

It should be noted that the specific description on the registration module 401 can refer to the corresponding content of the step S1 in the above-mentioned embodiment, the specific description on the verification association module 402 can refer to the corresponding content of the step S1 in the above-mentioned embodiment, the specific description on the shopping list generation module 403 can refer to the corresponding content of the step S2 and the steps S21, S22, S23, S24 and S25 in the above-mentioned embodiment, and the specific description on the checkout module 404 can refer to the corresponding content of the step S3 in the above-mentioned embodiment, which are not repeated herein.

Yet another embodiment of the present invention provides a checkout device, comprising: a camera, a processor and a memory. The camera is arranged on an accommodating case and used for acquiring a hand image of a customer. A shelf for bearing items is arranged in the accommodating case. The memory is used for recording processor-executable instructions. The processor is configured to verify whether a received unlocking request for opening the accommodating case is sent by the pre-registered customer, if so, issuing an unlocking instruction and associating the customer with a take-up action or a put-back action aiming at the item, generating a shopping list of the customer after identifying the take-up action or the put-back action, and the item at which the take-up action or the put-back action aims, and performing checkout of the shopping list.

Still a further embodiment of the present invention provides a checkout system. The checkout system comprises: a client terminal, an accommodating case and a checkout device. The client terminal is configured to receive identity information inputted by a customer upon registration and send the identity information to the checkout device, and configured to receive a shopping list issued by the checkout device. A shelf for bearing items is arranged in the accommodating case. A door of the accommodating case is provided with a door lock. The checkout device is the above-mentioned checkout device, and the specific content thereof is not repeated herein. The application procedure of the checkout system can be shown as follows. The customer completes registration at the client terminal, then holds the client terminal with a hand to scan a two-dimensional code or a bar code representative of identity information of the accommodating case at the accommodating case, so as to issue an unlocking request to the checkout device. After verification of the checkout device is passed, an unlocking instruction is sent to the accommodating case. The door lock of the accommodating case is unlocked, then the customer can open the door of the accommodating case to select the to-be-purchased item. The checkout device confirms the shopping behavior belongs to the customer. The take-up action or the put-back action of the customer and the item at which the take-up action or the put-back action aims are identified. After the customer closes the door of the accommodating case, the shopping list is generated for checkout.

From the above, the embodiments of the present invention bring the following beneficial effects.

The selling flow is friendly, and the customer experience is good. A plurality of various items can be purchased in one transaction, and the purchasing procedure is convenient and fast.

It can be known from common technical knowledge that the present invention can be implemented by other embodiments without departing from the spirit essence or necessary characteristics of the present invention. Therefore, the above-mentioned disclosed embodiments, in all aspects, merely are used for illustration rather than limitation. All changes made in the scope of the present invention or the scope equivalent to the present invention shall fall within the present invention.

What is claimed is:

1. A checkout method comprising the steps of:
   (S1) verifying whether a received unlocking request is sent by a pre-registered customer, and if so, issuing an unlocking instruction for opening an accommodating case in which a shelf for bearing an item is arranged, and associating the customer with a take-up action or a put-back action pertaining to the item using a camera associated with the accommodating case and trained on the shelf, the camera positioned and adapted to acquire a plurality of frames of consecutive hand images containing the item of the customer in front of the shelf, said associating based on optical motion analysis of the plurality of frames of consecutive hand images containing the item to identify the take-up action or the put-back action and automated image analysis using one or more machine-implemented, pre-trained classification models to identify the item;

(S2) generating a shopping list of the customer, after identifying the take-up action or the put-back action, and the item to which the take-up action or the put-back action pertains; and (S3) performing checkout of the shopping list;

wherein in the step (S2), identifying the item to which the take-up action or the put-back action pertains includes the steps of:

(S21) performing target detection on the plurality of acquired frames of hand images containing the item to obtain a plurality of rectangular area images correspondingly, wherein the rectangular area images are images corresponding to rectangular areas containing the item, and the plurality of frames of hand images correspond to a plurality of cameras in a one-to-one manner, (S22) acquiring a plurality of primary classification results correspondingly, according to the plurality of rectangular area images and a pre-trained first-level classification model, and acquiring a first-level classification result of the plurality of frames of hand images containing the item according to the plurality of primary classification results and a pre-trained first-level linear regression model, wherein the pre-trained first-level classification model is a model that is constructed by an image identification technique of a convolutional neural network and trained by all the items in the accommodating case, (S23) using the first-level classification result as a first classification result, and (S24) using the first classification result as a to-be-identified item; and wherein the method further comprises:

maintaining a list of visually similar items in the accommodating case and distinguishing between items on the list of visually similar items when the first classification result indicates an item on the list of visually similar items by, after the step (S22) and before the step (S24), (S25) obtaining a plurality of secondary classification results correspondingly, according to the plurality of rectangular area images and a pre-trained second-level classification model, acquiring a second-level classification result of the plurality of frames of hand images containing the item according to the plurality of secondary classification results and a pre-trained second-level linear regression model, and using the second-level classification result as a first classification result, and wherein the second-level classification model is a model that is constructed by the image identification technique of the convolutional neural network and trained based on the list of visually similar items.

2. The checkout method according to claim 1, wherein in the step (S2), identifying the take-up action or the put-back action comprises:

acquiring the plurality of frames of consecutive hand images containing the item of the customer in front of the shelf, and establishing a motion track of the hand for the plurality of frames of consecutive hand images containing the item on a timeline, when it is detected that the motion track of the hand is an inward movement from the outside of a predetermined virtual action boundary and the item is taken in the hand, identifying the action as the put-back action; and when it is detected that the motion track of the hand is an outward movement from the inside of the virtual action boundary and the item is taken in the hand, identifying the action as the take-up action;

wherein the outside of the virtual action boundary is in a direction away from the shelf, and the inside of the virtual action boundary is in a direction close to the shelf.

3. A checkout device comprising:

a case sized and adapted to accommodate one or more items, the case having
a shelf within the case to support the one or more items,
one or more cameras trained on the shelf,
a closure that blocks access to the case when closed, and
an electronically-actuatable lock on the closure;

a registration module configured to receive identity information and account information that are inputted by a customer upon registration;

a verification association module configured to be connected with the registration module and configured to verify whether a received unlocking request is sent by a pre-registered customer, and if so, the verification association module issues an unlocking instruction for opening the lock on the closure of the case, and associates the customer with a take-up action or a put-back action pertaining to an item of the one or more items by using the one or more cameras to acquire a plurality of frames of consecutive hand images containing the item, said associating based on optical motion analysis of the plurality of frames of consecutive hand images containing the item and automated image analysis using one or more machine-implemented, pre-trained classification models to identify the item;

a shopping list generation module configured to be connected with the verification association module and configured to generate a shopping list of the customer, after identifying the take-up action or the put-back action, and the item to which the take-up action or the put-back action pertains, the shopping list generation module including an action identification unit configured to acquire the plurality of frames of consecutive hand images containing the item of the customer in front of the shelf and establish a motion track of a hand for the plurality of frames of consecutive hand images containing the item on a timeline in order to identify the take-up action or the put-back action, an item identification unit configured to identify the item to which the take-up action or the put-back action pertains, including
a target detection subunit configured to perform target detection on the plurality of frames of hand images containing the item that are acquired by the action identification unit, in order to obtain a plurality of rectangular area images correspondingly, wherein the rectangular area images are images corresponding to rectangular areas containing the item, and the plurality of frames of hand images containing the item correspond to a plurality of cameras in a one-to-one manner,
a first classification subunit configured to acquire a plurality of primary classification results correspondingly, according to the plurality of rectangular area images and a pre-trained first-level classification model, and configured to acquire a first-level classification result of the plurality of frames of hand images containing the item according to the plurality of primary classification results and a pre-trained first-level linear regression model, wherein the pre-trained first-level classification model is a model that is constructed by an image identification technique of a convolutional neural network and trained by the one or more items in the accommodating case,
a confirmation subunit configured to use the first-level classification result as a first classification result,
a result determination subunit configured to use the first classification result as a to-be-identified item,
a judgment subunit configured to be connected with the first classification subunit and a second classification subunit, and configured to maintain a list of similar items of the one or more items, to judge whether the first-level classification result reflects an item of the list of similar items, and to execute a second classification subunit in response to a positive judgment, and
the second classification subunit configured to obtain a plurality of secondary classification results correspondingly, according to the plurality of rectangular area images and a pre-trained second-level classification model, acquire a second-level classification result of the plurality of frames of hand images containing the item according to the plurality of secondary classification results and a pre-trained second-level linear regression model, and use the second-level classification result as a first classification result, wherein the second-level classification model is a model that is constructed by the image identification technique of the convolutional neural network and trained by the one or more items in the accommodating case in advance; and
a checkout module configured to be connected with the shopping list generation module and configured to perform checkout of the shopping list generated by the shopping list generation module.

4. The checkout device according to claim 3, wherein the shopping list generation module further comprises:
a shopping list generation unit configured to be connected with the verification association module, the action identification unit and the item identification unit, and configured to generate the shopping list of the customer according to the identity information of the customer associated by the verification association module, the take-up action or the put-back action identified by the action identification unit and the item to which the take-up action or the put-back action pertains identified by the item identification unit.

5. The device of claim 3, wherein the action identification unit is further configured such that
when it is detected that the motion track of the hand is an inward movement from the outside of a predetermined virtual action boundary and the item is taken in the hand, identify the action as the put-back action; and
when it is detected that the motion track of the hand is an outward movement from the inside of the virtual action boundary and the item is taken in the hand, identify the action as the take-up action;
wherein the outside of the virtual action boundary is in a direction away from the shelf, and the inside of the virtual action boundary is in a direction close to the shelf.

6. A checkout method comprising the steps of:
(S1) verifying whether a received unlocking request is sent by a pre-registered customer, and if so, issuing an unlocking instruction for opening an accommodating case in which a shelf for bearing an item is arranged, and associating the customer with a take-up action or a put-back action pertaining to the item;
(S2) generating a shopping list of the customer, after automatically identifying the take-up action or the put-back action, and automatically identifying the item to which the take-up action or the put-back action pertains using image capture of a plurality of consecutive image frames and automated image analysis of the captured consecutive image frames for establishing a motion track of a hand of the customer taking the item; and
(S3) performing checkout of the shopping list;
wherein the automated image analysis for identifying the item comprises
acquiring a plurality of primary classification results according to a pre-trained first-level classification model in which the pre-trained first-level classification model is trained by images of all items on a shelf,
determining a first-level classification result according to the plurality of primary classification results and, when it is determined by a processor that the first-level classification result is one of a number of visually similar items on the shelf,
acquiring a plurality of secondary classification results according to a pre-trained second-level classification model in which the second-level classification model is pre-trained in advance by images of all the similar items on the shelf,
determining a second-level classification result according to the plurality of secondary classification results, and
determining the item identification result according to the second-level classification result.

7. A checkout device comprising:
a camera configured to be arranged on an accommodating case in which a shelf for bearing an item is arranged and configured to acquire a hand image of a customer containing the item;
a processor; and
a memory that records processor-executable instructions;
wherein the processor is configured to:
verify whether a received unlocking request is sent by the pre-registered customer, if so, issue an unlocking instruction for opening the accommodating case, and associate the customer with a take-up action or a put-back action pertaining to the item,
generate a shopping list of the customer after automatically identifying the take-up action or the put-back action and the item to which the take-up action or the put-back action pertains using image capture and automated image analysis of the consecutive image frames for establishing a motion track of a hand of the customer, wherein, in performing the automated image analysis for identifying the item, the processor is configured to acquire a plurality of primary classification results according to a pre-trained first-level classification model in which the pre-trained first-level classification model is trained by images of all items on a shelf, determine a first-level classification result according to the plurality of primary classification results and, when it is determined by the processor that the first-level classification result is one of a number of visually similar items on the shelf, acquire a plurality of secondary classification results according to a pre-trained second-level classification model in which the second-level classification model is pre-trained in advance by images of all the similar items on the shelf, determine a second-level classification result according to the plurality of secondary classification results, and determine the item identification result according to the second-level classification result; and perform checkout of the shopping list.

* * * * *